US011663740B2

(12) United States Patent
Dworakowski et al.

(10) Patent No.: US 11,663,740 B2
(45) Date of Patent: *May 30, 2023

(54) METHOD FOR CALIBRATING THE POSITION AND ORIENTATION OF A CAMERA RELATIVE TO A CALIBRATION PATTERN

(71) Applicant: Aptiv Technologies Limited, St. Michael (BB)

(72) Inventors: Waldemar Dworakowski, Cracow (PL); Rafal Dlugosz, Poznan (PL); Krzysztof Gongolewski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,004

(22) Filed: Apr. 27, 2022

(65) Prior Publication Data
US 2022/0254066 A1 Aug. 11, 2022

Related U.S. Application Data

(63) Continuation of application No. 16/266,555, filed on Feb. 4, 2019, now Pat. No. 11,341,681.

(30) Foreign Application Priority Data

Feb. 28, 2018 (EP) ..................................... 18159313

(51) Int. Cl.
*G06T 5/00* (2006.01)
*G06T 7/73* (2017.01)
*G06T 7/80* (2017.01)

(52) U.S. Cl.
CPC ................ *G06T 7/80* (2017.01); *G06T 5/002* (2013.01); *G06T 7/73* (2017.01); *G06T 7/74* (2017.01);

(Continued)

(58) Field of Classification Search
CPC .. G06T 5/002; G06T 7/73; G06T 7/74; G06T 7/80; G06T 2207/20024;
(Continued)

(56) References Cited

U.S. PATENT DOCUMENTS 5,982,912 A 11/1999 Fukui et al.
6,292,171 B1 9/2001 Fu et al.
(Continued)

FOREIGN PATENT DOCUMENTS

CN 102171067 A 8/2011
CN 103035005 A 4/2013
(Continued)

OTHER PUBLICATIONS

Lu et al. ("Fast and globally convergent pose estimation from video images," IEEE Transactions on Pattern Analysis and Machine Intelligence, vol. 22, No. 6, 2000) (Year: 2000).*

(Continued)

*Primary Examiner* — Yubin Hung
(74) *Attorney, Agent, or Firm* — Sawtooth Patent Group PLLC

(57) ABSTRACT

A method for calibrating the position and orientation of a camera, in particular a vehicle-mounted camera, relative to a calibration pattern includes the steps of: A] acquiring an image of the calibration pattern by the camera; B] determining a parameter of the image or of the calibration pattern; C] transforming the image based on the parameter; D] identifying characteristic points or possible characteristic points of the calibration pattern within the transformed image; E] deriving the position or orientation of the camera relative to the calibration pattern from the identified characteristic points or possible characteristic points; F] in dependence of a confidence value of the derived position or orientation of the camera or in dependence of the number of (Continued)

iterations of steps B to F so far, repeating steps B to F; and G] outputting the position or orientation of the camera derived in the last iteration of step E.

20 Claims, 2 Drawing Sheets

(52) U.S. Cl.
CPC .............. *G06F 2218/04* (2023.01); *G06T 2207/20024* (2013.01); *G06T 2207/30244* (2013.01); *G06T 2207/30252* (2013.01)

(58) Field of Classification Search
CPC ........... G06T 2207/30244; G06T 2207/30252; G06K 9/0051; G06F 2218/04
See application file for complete search history.

(56) References Cited

U.S. PATENT DOCUMENTS

| | | | |
|---|---|---|---|
| 6,915,072 B2 | 7/2005 | Takahashi et al. | |
| 8,295,588 B2 | 10/2012 | Fujieda et al. | |
| 9,319,667 B2 | 4/2016 | Lin et al. | |
| 9,441,958 B2 | 9/2016 | Hara | |
| 9,739,603 B2 | 8/2017 | Hara | |
| 10,218,961 B2 | 2/2019 | Kishiwada et al. | |
| 10,776,953 B2 | 9/2020 | Dworakowski et al. | |
| 10,872,267 B2 | 12/2020 | Dlugosz et al. | |
| 10,902,640 B2 | 1/2021 | Dlugosz et al. | |
| 11,113,843 B2 | 9/2021 | Dworakowski et al. | |
| 2002/0044676 A1 | 4/2002 | Wei et al. | |
| 2004/0225472 A1 | 11/2004 | Kraft | |
| 2005/0068308 A1* | 3/2005 | Simard | H04N 7/142 345/175 |
| 2006/0004280 A1* | 1/2006 | Kotake | G06T 7/73 600/414 |
| 2006/0215031 A1 | 9/2006 | Krahnstoever et al. | |
| 2006/0288325 A1* | 12/2006 | Miyamoto | G03F 7/70625 716/50 |
| 2006/0289757 A1* | 12/2006 | Kochi | H01J 37/265 250/310 |
| 2007/0047940 A1* | 3/2007 | Matsumoto | G01S 17/86 396/106 |
| 2008/0080744 A1* | 4/2008 | Tanaka | G06K 9/00248 382/118 |
| 2008/0095445 A1* | 4/2008 | Brandt | G06T 7/11 382/203 |
| 2008/0170228 A1 | 7/2008 | Jiang | |
| 2008/0204670 A1 | 8/2008 | Furui | |
| 2009/0231374 A1 | 9/2009 | Wynckel et al. | |
| 2009/0299684 A1* | 12/2009 | Imanishi | G06T 7/80 702/150 |
| 2010/0134634 A1* | 6/2010 | Witt | G06T 7/74 348/181 |
| 2010/0194886 A1* | 8/2010 | Asari | G06T 7/85 348/148 |
| 2010/0217416 A1 | 8/2010 | Murabata | |
| 2010/0232681 A1 | 9/2010 | Fujieda et al. | |
| 2010/0295948 A1 | 11/2010 | Xie et al. | |
| 2010/0315601 A1 | 12/2010 | Furui | |
| 2011/0069284 A1 | 3/2011 | Furui | |
| 2011/0234759 A1 | 9/2011 | Yamaya et al. | |
| 2011/0300939 A1* | 12/2011 | Mao | G06F 3/0334 463/36 |
| 2011/0321084 A1 | 12/2011 | Takahashi et al. | |
| 2012/0033087 A1 | 2/2012 | Takeda et al. | |
| 2012/0212627 A1* | 8/2012 | Klose | H04N 9/3194 348/189 |
| 2012/0230600 A1* | 9/2012 | Tsai | G06T 5/20 382/260 |
| 2012/0233841 A1* | 9/2012 | Stein | G03B 17/02 29/428 |
| 2012/0327220 A1 | 12/2012 | Ma | |
| 2013/0051664 A1* | 2/2013 | Fujita | G06T 5/20 382/165 |
| 2013/0216153 A1* | 8/2013 | Hsu | G06T 5/002 382/263 |
| 2014/0043473 A1 | 2/2014 | Gupta et al. | |
| 2014/0293299 A1* | 10/2014 | Ozawa | H04N 1/40062 358/1.9 |
| 2015/0049193 A1 | 2/2015 | Gupta et al. | |
| 2015/0078675 A1* | 3/2015 | Tian | G06T 5/002 382/260 |
| 2015/0245020 A1* | 8/2015 | Meier | G06T 7/75 348/135 |
| 2015/0287215 A1 | 10/2015 | Ohba et al. | |
| 2015/0363921 A1* | 12/2015 | Baek | G06K 9/522 348/241 |
| 2016/0180176 A1* | 6/2016 | Yamamoto | G06T 7/269 382/103 |
| 2017/0177973 A1 | 6/2017 | Hu | |
| 2017/0316557 A1* | 11/2017 | Inoue | G06T 7/001 |
| 2017/0345321 A1* | 11/2017 | Cross | B64D 45/08 |
| 2018/0080766 A1 | 3/2018 | Johnson | |
| 2018/0080787 A1* | 3/2018 | Laine | G01C 21/3602 |
| 2018/0122099 A1* | 5/2018 | Lee | G06T 3/0062 |
| 2018/0170540 A1* | 6/2018 | Claybrough | G05D 1/0094 |
| 2018/0197276 A1* | 7/2018 | Kim | H04N 19/117 |
| 2018/0322656 A1 | 11/2018 | Dworakowski et al. | |
| 2018/0357509 A1 | 12/2018 | Dlugosz et al. | |
| 2018/0357791 A1 | 12/2018 | Dworakowski et al. | |
| 2019/0096091 A1* | 3/2019 | Bao | G06T 7/11 |
| 2019/0266752 A1 | 8/2019 | Dlugosz et al. | |

FOREIGN PATENT DOCUMENTS

| | | |
|---|---|---|
| CN | 104517283 A | 4/2015 |
| CN | 104539925 A | 4/2015 |
| CN | 104715473 A | 6/2015 |
| DE | 102004033468 A1 | 12/2005 |
| EP | 2437495 B1 | 11/2016 |
| EP | 3125196 A1 | 2/2017 |
| EP | 3173975 A1 | 5/2017 |
| EP | 3173979 A1 | 5/2017 |
| EP | 3174007 A1 | 5/2017 |
| EP | 3179462 A1 | 6/2017 |
| JP | 2013052784 A | 3/2013 |

OTHER PUBLICATIONS

Liu et al. ("Robust Camera Calibration by Optimal Localization of Spatial Control Points," IEEE Transactions on Instrumentation and Measurement, vol. 63, Issue: 12, Dec. 2014) (Year: 2014).*
"Extended European Search Report", EP Application No. 15196969.8, dated May 9, 2016, 5 pages.
"Extended European Search Report", EP Application No. 18159313.8, dated Jul. 23, 2018, 8 pages.
"Foreign Office Action", CN Application No. 201680069618.0, dated Mar. 3, 2021, 12 pages.
"Foreign Office Action", EP Application No. 18159313.8, dated May 25, 2021, 6 pages.
"International Preliminary Report on Patentability", Application No. PCT/EP2016/078006, dated Jun. 14, 2018, 7 pages.
"International Search Report and Written Opinion", Application No. PCT/EP2016/078006, dated Jan. 3, 2017, 8 pages.
Bay, et al., "Speeded-Up Robust Features (SURF)", Jun. 2008, pp. 346-359, 14 pages.
Liu, et al., "Robust Camera Calibration by Optimal Localization of Spatial Control Points", IEEE Transactions on Instrumentation and Measurement, vol. 63, No. 12, Dec. 2014, pp. 3076-3087.
Lu, et al., "Fast and Globally Convergent Pose Estimation from Video Images", IEEE Transactions on Pattern Analysis and Machine Intelligence, vol. 22, No. 6, Jun. 2000, pp. 610-622.
Theiler, et al., "Automatic Registration of Terrestrial Laser Scanner Point Clouds using Natural Planar Surfaces", Jul. 2012, 6 pages.
Turk, "Zippered Polygon Meshes from Range Image", Jul. 1994, 8 pages.

(56) References Cited

OTHER PUBLICATIONS

"Foreign Office Action", CN Application No. 201910146397.8, dated Oct. 21, 2022, 11 pages.

* cited by examiner

METHOD FOR CALIBRATING THE POSITION AND ORIENTATION OF A CAMERA RELATIVE TO A CALIBRATION PATTERN

CROSS-REFERENCE TO RELATED APPLICATIONS

This application is a continuation of U.S. patent application Ser. No. 16/266,555, filed Feb. 4, 2019, which claims priority to European Patent Application Number 18159313.8, filed Feb. 28, 2018, the disclosures of which are hereby incorporated by reference in their entireties herein.

TECHNICAL FIELD OF INVENTION

The invention relates to a method for calibrating the position and orientation of a camera, in particular a camera mounted to a vehicle such as a truck, relative to a calibration pattern.

BACKGROUND OF INVENTION

Recently, an increasing number of vehicles are provided with at least one camera mounted to the vehicle for capturing information about an environment of the vehicle. In particular, the camera is located at a front of the vehicle for acquisition of the road ahead. Image data thus obtained can then be used for various advanced driver assistance systems (ADAS), for example.

From images acquired by such a camera spatial data about objects within the field of view of the camera can be extracted. However, this data are relative to the camera, but not (at least not directly) to the vehicle. Hence, for example positions of objects captured by the camera can only be determined with respect to the camera. To also obtain from images acquired by the camera the positions of such objects relative to the vehicle with high precision and reliability, it is therefore important to precisely know the position and orientation of the camera relative to the vehicle.

Especially placing the camera with a well-defined orientation relative to the vehicle is rather difficult. Therefore, the camera will almost certainly deviate from an ideal orientation, with the real orientation varying for different cameras in different vehicles.

The orientation of the camera can be described by three angles commonly referred to as roll angle, yaw angle and pitch angle. The roll angle specifies the angle of rotation around a longitudinal axis, which for a camera in particular corresponds to an optical axis of the camera. Hence, the axis of rotation of the roll angle is defined relative to the camera and therefore changes its orientation together with the camera, for example if the camera is tilted or panned. The yaw angle specifies an angle of rotation around a vertical axis and thus, at least essentially, defines deviations from the ideal orientation to the left or to the right. The pitch angle specifies an angle of rotation around a horizontal axis and thus, at least essentially, defines deviations from the ideal orientation to the top or to the bottom.

Calibrating the orientation of a camera mounted to a vehicle preferably comprises determining at least one of the roll angle, the yaw angle and the pitch angle. Preferentially all three of these are determined so as to fully describe the orientation of the camera.

Determining these angles can generally be done during movement of the vehicle, for example while driving on a road. In this way, the calibration method can take advantage from information which can be derived from differences between consecutively acquired images due to the movement in a specific direction. Such a calibration, however, can be time-consuming and therefore costly. Because of this, a calibration method which can be executed on a stationary vehicle can be preferable.

There are calibration methods which depend on the height of the camera being known and fixed. However, in particular if the vehicle is a truck, the height of the camera, even though mounted to a defined location at the vehicle, can change significantly. This can be due to a rather soft suspension of the vehicle, as a result of which a driver cabin of the vehicle, to which the camera might be mounted, can change its height by up to several tens of centimeters, for example. It is therefore preferred that the calibration method does not depend on the height of the mounted camera. Preferentially, the height of the camera as well as a lateral offset of the camera can even be determined as part of the calibration.

Methods for calibrating the position and/or orientation of a camera mounted to a vehicle which are in particular reliable and quick are, for example, described in the patent application EP 3 174 007 A1. These methods rely on placing the camera in front of a calibration pattern an image of which is acquired by means of the camera, and deriving the position and/or orientation of the camera from horizontal and vertical lines defined by the calibration pattern which can be identified within the image of the calibration pattern. In particular, these lines may be defined by characteristic points of the calibration pattern or of one or more sub-patterns of the calibration pattern. Generally, other methods may possibly allow determining the position and/or orientation of the camera from such characteristic points of the calibration pattern directly, i.e. without the intermediate step of deriving horizontal and vertical lines from the characteristic points.

In order to identify the characteristic points of the calibration pattern within the image of the calibration pattern, the image may possibly be preprocessed and searched for spots that could correspond to a characteristic point of the calibration pattern. Methods for identification of such possible characteristic points of a calibration pattern within an image of the calibration pattern are, for example, described in the patent application EP 3 173 975 A1. However, the possible characteristic points identified by such or some other method may still contain false positives. Therefore, the possible characteristic points may be considered merely a set of candidate points within which the true characteristic points of the calibration pattern still have to be identified. Methods for doing so are, for example, described in EP 3 173 979 A1. According to these methods, simply put, a template corresponding to the calibration pattern or to a sub-pattern of the calibration pattern is successively placed on each of the candidate points and the areas of the image overlaid by the template are checked for their correspondence with the template. If the deviation from the template does not exceed a certain tolerance, the corresponding candidate point is considered representing a characteristic point of the calibration pattern.

However, such methods of determining the position and/or orientation of a camera relative to a calibration pattern rely on the image of the calibration pattern, which is acquired by means of the camera, and therefore depend on the quality of the image. In particular, if the calibration pattern appears distorted in the image, this may lead to false results because then even true characteristic points of the calibration pattern may deviate from their expected appearance and may therefore not be recognized as characteristic points due to their lack of correspondence with the template. The image of the calibration pattern may, for example, be deteriorated by noise, especially in unfavorable lighting conditions. While such problems may generally be corrected, for example by improved lighting, distortions resulting from specifics of the camera may not be correctable, at least not easily. For example, for a camera mounted to a vehicle, especially to a truck, it may generally be advantageous to have a wide field of view, for example by using a camera with an objective that has a focal length of 50 mm (equivalent) or more, because such a wide-angle camera allows monitoring a larger area than a camera with a narrower field of view. However, wide-angle optics lead to distortions in the acquired image. Hence, the identification of characteristic points in the image of a calibration pattern may be hampered by such distortions if this kind of camera is used.

SUMMARY OF THE INVENTION

It is an objective of the invention to provide a method for calibrating the position and orientation of a camera, in particular a camera mounted to a vehicle such as a truck, relative to a calibration pattern with high precision and improved reliability against interfering influences of distortions.

This objective is solved by a method in accordance with claim 1. Advantageous embodiments of the invention are defined by the dependent claims as well as by the following description of the invention and the Figures.

The method according to the invention comprises that at least the following steps A to G are executed.

Step A includes that an image of the calibration pattern is acquired by means of the camera. Depending for example on the focal length of an objective of the camera, but possibly also on the perspective under which the calibration pattern or at least parts of the calibration pattern appear from the point of view of the camera, the calibration pattern may appear distorted in the acquired image.

A first measure to compensate for such distortions is step B which includes determining at least one parameter of the image and/or of the calibration pattern or a sub-pattern of the calibration pattern as it appears in the image. Such parameters may be obtained using additional knowledge of the circumstances, for example knowledge of perspective distortions or lens distortions or knowledge of an expected or nominal relation between the camera and the calibration pattern which determines where in the acquired image the calibration pattern or sub-patterns of the calibration pattern are located and/or under which perspective the calibration pattern is seen by the camera. Such knowledge, however, usually is not precise enough or sufficient to simply mathematically correct all distortions, but may rather correspond to informed estimates or even mere assumptions. Nevertheless, the at least one parameter advantageously allows at least approximatively adapting the calibration (in particular the identification of characteristic points for determining the position and/or orientation of the camera) to possible distortions in the image of the calibration pattern. More specific examples of parameters to be determined and how such parameter may be used are described below.

Step C includes that the acquired image is transformed based on the at least one parameter determined in the preceding step B. It is within this transformed image of the calibration pattern that then, in step D, characteristic points or at least possible characteristic points of the calibration pattern are identified. The transformation particularly serves to prepare the image for easier extraction of relevant information. Such transformation can in particular include that a part of the image is isolated and only that part of the image is used for the further processing and/or that the image is smoothed and/or otherwise filtered, as is explained in more detail below.

Step E includes that, after the characteristic points or possible characteristic points are identified, the position and/or orientation of the camera relative to the calibration pattern is derived from the identified characteristic points or possible characteristic points. Step D and/or step E can in particular be executed in accordance with one of the methods described in the patent applications specified above. An important difference to known methods, however, is that the image on which the identification of the characteristic points or possible characteristic points is based is not the originally acquired image, but an image that is transformed based on the at least one parameter determined in step B. Moreover, the method according to the present invention does not stop after the position and/or orientation of the camera relative to the calibration pattern is derived in step E, but continues with step F.

Step F includes that under certain conditions steps B to F are repeated, wherein in step B of the upcoming iteration(s) the position and/or orientation of the camera derived in the current iteration of step E are taken into account for newly determining the at least one parameter. In other words, the position and/or orientation of the camera derived in the current iteration of step E are at this point considered merely preliminary results that instead of being output are used for another iteration so as to improve the next results. Whether steps B to F are repeated, may simply depend on the number of iterations of steps B to F so far. For example, according to an embodiment, there may be no more than two iterations in any case, i.e. steps B to F are repeated once at most. Additionally, or alternatively, steps B to F may in any case be repeated at least once. Generally, however, at least under certain circumstances, steps B to F may not be repeated at all.

Furthermore, whether steps B to F are repeated can, alternatively or additionally to the dependence on the number of iterations, depend on a confidence value of the position and/or orientation of the camera derived in the latest iteration of step E. This confidence value is a measure for how certain or precisely the derived position and/or orientation of the camera at least assumedly correspond to the real position and/or orientation of the camera. Generally, the confidence value can be a Boolean value, but preferably is a numerical value that can be compared to a confidence threshold. Steps B to F are preferentially iterated as long as the confidence value determined in step F of each iteration signifies that improvements with respect to the precision of the derived position and/or orientation of the camera are to be expected from repeating steps B to F (again). The number of iterations can be limited to a maximum number, though.

In step G, which is only reached, if steps B to F are not, or no longer, repeated, the position and/or orientation of the camera derived in the last iteration of step E are finally output and thus correspond to the actual result of the calibration.

According to an embodiment, in step B determining at least one parameter of the image comprises determining at least one region of interest within the image which is expected to include the calibration pattern or a sub-pattern of the calibration pattern. While the exact spatial relationship between the camera and the calibration pattern is not known prior to the calibration, the camera may be placed within a known spatial range relative to the calibration pattern. This can confine the possible position of the calibration pattern within the field of view of the camera and hence confine the possible location of the calibration pattern within the image acquired by the camera. With such knowledge, at least one region of interest can be determined which may include the entire calibration pattern or only a part of it. Also, several regions of interest can be determined each of which, for example, includes another (instance of a) sub-pattern of the calibration pattern. Determining one or more such regions of interest allows restricting the image in step C to these regions of interest such that further transformations are applied only to these parts of the image. In this way, the computational complexity of the method and the time required for executing the method may significantly be reduced. This can offset or even more than offset the adverse increase in computational time due to the repeated execution of steps B to F.

According to an embodiment, in step B determining at least one parameter of the calibration pattern or a sub-pattern of the calibration pattern comprises determining the size and/or shape of the calibration pattern or sub-pattern as it appears in the image. If such a parameter is determined, it may consequently include information about the kind and/or amount of distortion in the image. While in the first execution of step B the determination of such a parameter may be based on preliminary data only, such as estimates derived from an average or nominal positioning of the camera in front of the calibration pattern, in subsequent iterations the determination of the parameter may take into account the results or intermediate results of preceding steps, in particular the (preliminarily) derived position and/or orientation of the camera. Hence, with each iteration, the parameter may include more precise information and therefore better allow compensating distortions of the calibration pattern in the image.

In particular, the determined size and/or shape of the calibration pattern or sub-pattern in the image can be used in step C for transforming the image. For example, transforming the image then comprises defining a filter kernel based on the determined size and/or shape of the calibration pattern or sub-pattern in the image and filtering the image using the filter kernel. The defined filter kernel can be derived from an ideal filter kernel which is then merely modified, in particular with respect to its size, based on the determined size and/or shape of the calibration pattern or sub-pattern. In this way, the filter kernel can specifically be adapted to the (distorted) appearance of the calibration pattern in the image. This is particularly important, if the filtering serves to help isolate or emphasize the calibration pattern within the image, as for example in the methods described in EP 3 173 975 A1.

Furthermore, the determined size and/or shape of the calibration pattern or sub-pattern as it appears in the image can also be used for adapting a template which corresponds to the calibration pattern or the sub-pattern such that the adapted template better matches the distorted appearance of the calibration pattern or sub-pattern in the image. Such template, which can be a template arrangement of template points that are arranged in correspondence to special points such as corners of the calibration pattern or a sub-pattern of the calibration pattern, is, for example, used in the methods described in EP 3 173 979 A1. These methods, or at least essential steps of these methods, may be executed as part of step D of the method according to the present invention and benefit from the adaptation of the template based on the determined at least one parameter. Consequently, not only the transformation of the image according to step C, but also the identification of (possible) characteristic points in step D may be based on the at least one parameter determined in step B, especially if the parameter corresponds to the size and/or shape of the calibration pattern or sub-pattern as it appears in the image.

According to an embodiment, in step C transforming the image comprises smoothing the image by, for each pixel of the image, replacing a pixel value of the pixel by an average of the pixel values of pixels in a vicinity of the pixel, the vicinity of the pixel being defined in dependence of the at least one parameter determined in step B. Such smoothing may help reducing background noise that could lead to spurious characteristic points, i.e. points which are falsely identified as characteristic points. To what extent the image shall be smoothed so as to remove unwanted noise, while not blurring out the calibration pattern, however, may depend on how (in particular at what size) the calibration pattern appears in the image. Therefore, the vicinity over which the pixel values are average preferably decreases with smaller size of the calibration pattern in the image.

According to an embodiment, in step C transforming the image comprises filtering the image or a smoothed image derived from the image by convolution with a filter kernel which is defined in dependence of the at least one parameter determined in step B. Convolving the image with a filter kernel that advantageously corresponds to the calibration pattern or to a sub-pattern of the calibration pattern can result in a filtered image in which the calibration pattern or sub-pattern appears isolated, emphasized or in some other way pronounced. Such preprocessing therefore may facilitate the identification of characteristic points of the calibration pattern or sub-pattern. As described above for any kind of filtering, also the filter kernel used for the convolution is advantageously defined in dependence of the at least one parameter determined in step B. This can include deriving the filter kernel from an ideal filter kernel by modifying the ideal filter kernel based on the at least one parameter. In this way, the filter kernel can specifically be adapted to the (distorted) appearance of the calibration pattern in the image.

The convolution of the (possibly smoothed) image with the filter kernel can be replaced by a convolution of an integral image with a modified filter kernel. This can significantly reduce the computational complexity and hence the execution time of the convolution. It is therefore preferred that the convolution of the image or smoothed image comprises the steps of deriving an integral image from the image or smoothed image by, for each pixel of the image or smoothed image, replacing the pixel value of the respective pixel by the sum of the pixel values of pixels having smaller first and second coordinates than the respective pixel; and convolving the integral image with a modified filter kernel corresponding to the filter kernel. The correspondence between the filter kernel and the modified filter kernel is such that the convolution of the integral image with the modified filter kernel leads to the same results as the convolution of the original image with the unmodified filter kernel.

Furthermore, the convolution preferably is a discrete convolution defined as a two-dimensional summation of the product of the filter kernel and the image or smoothed image (an image being a matrix of pixel values of the pixels of the image). For a usual convolution, the step size of the summation is usually 1 in both dimensions so as to sum up said product for all positions of the filter kernel relative to the image. However, by using a greater step size in at least one or both dimensions the computational effort for calculating the convolution can significantly be reduced, though with the resulting image being more coarsely filtered. According to an embodiment, the step size of the summation depends on the number of iterations of steps B to F so far and/or on the at least one parameter determined in step B in the current iteration.

Preferably, in the first iteration (i.e. the first execution) of step C the step size of the summation is greater than in a subsequent iteration of step C, in particular greater than in any subsequent iteration of step C. This means that at least the first convolution executed for filtering the image is coarser than a subsequent convolution. Since the results of the first iteration of steps B to F may expectedly be merely preliminary and primarily serve as a basis for enhancing further iterations, especially the first convolution can have a step size greater than I so as to reduce the computational effort of the first iteration, while still yielding a first approximation of the position and/or orientation of the camera. Preferably, while the step size may decrease, it never increases with the iterations. Also, the step size may preferably be I for at least the last iteration or for all iterations but the first.

According to an embodiment, in step E deriving the position and/or orientation of the camera comprises calculating at least one of a lateral (horizontal) offset and a height (which corresponds to a vertical offset) of the camera relative to the calibration pattern and/or calculating at least one of a roll angle, a yaw angle and a pitch angle of the camera relative to the calibration pattern. Examples of how such calculation may be executed for a calibration pattern that defines at least two horizontal and at least to vertical lines are described in EP 3 174 007 A1. However, depending in particular on the kind of calibration pattern, other methods may be used. By calculating the roll angle, the yaw angle and the pitch angle, the orientation of the camera relative to the calibration pattern can be fully determined.

As regards the position of the camera relative to the calibration pattern, it may be sufficient to know the horizontal offset and the vertical offset of the camera relative to the calibration pattern, for example relative to a surface normal of the calibration pattern extending perpendicularly from a center or a corner of the calibration pattern. The distance of the camera to the calibration pattern, in particular the distance of the camera to a surface of the calibration pattern in a direction perpendicular to the surface, may be less crucial for the calibration of a camera mounted to a vehicle or may at least approximately be known from the onset of the calibration.

However, the distance may have an influence on the appearance of the calibration pattern, in particular to its size, in the image of the calibration pattern acquired by the camera. Therefore, to fully determine the position of the camera relative to the calibration pattern, besides the horizontal and vertical offsets also the distance may be determined, for example by measurement or preferably also from the image of the calibration pattern. A method of iteratively adapting (the size of) a template arrangement used to identify characteristic points of the calibration pattern within a set of candidate points previously derived from the image of the calibration pattern to the size of the calibration pattern in the image is described in the patent application titled "Method for identification of characteristic points of a calibration pattern within a set of candidate points derived from an image of the calibration pattern" of the same applicant and filed at the same filing date as this application, which is hereby referenced. Such method allows identifying the characteristic points without first having to know the distance, and may even yield an at least approximated distance as a result of the adaptation. If such or another method yielding the distance is used in step D for identifying the characteristic points or in step E for deriving the position of the camera from identified possible characteristic points (candidate points), then the position of the camera determined by the calibration can advantageously also include the distance of the camera to the calibration pattern.

According to an embodiment, in step B, except in the first iteration of step B, determining at least one region of interest comprises transforming, for example shifting, rotating, tilting, skewing and/or scaling, the region of interest determined in the immediately preceding iteration of step B according to the calculated at least one of a roll angle, a yaw angle and a pitch angle of the camera and/or to the calculated at least one of a lateral offset and a height of the camera. These calculated values are considered intermediate results which allow adapting the at least one region of interest more precisely to the position of the calibration pattern or of sub-patterns of the calibration pattern within the image. The transformation can furthermore take into account known parameters of the camera, such as a focal length. The kind and extend of the transformations applied to the at least one region of interest can be derived from the said calculated values by known principles of three-dimensional geometry and trigonometry.

In a similar manner, the intermediate results of a previous iteration may be used for refining the previously determined size and/or shape of the calibration pattern or sub-pattern. According to an embodiment, in step B, except in the first iteration of step B, determining the size and/or shape of the calibration pattern or sub-pattern comprises transforming the size and/or shape of the calibration pattern or sub-pattern determined in the immediately preceding iteration of step B according to the calculated at least one of a roll angle, a yaw angle and a pitch angle of the camera and/or to the calculated at least one of a lateral offset and a height of the camera. Such transformation of can be as described above for transformations of a region of interest.

In step D merely possible characteristic points may be identified. This means that a plurality of points is identified which ideally includes all of the characteristic points of the calibration pattern that are searched for in the image of the calibration pattern, but most probably also includes several further points that are not true characteristic points of the calibration pattern. This may be because the method used for identification of these points may not be sufficiently distinctive. If, at least at first, merely possible characteristic points are identified, which can then be regarded as a set of candidate points, step D can additionally include that subsequently the characteristic points of the calibration pattern are identified within this set of candidate points. However, this is not necessarily the case. Instead the next steps may also be based directly on the identified merely possible characteristic points.

According to an embodiment, in step D possible characteristic points of the calibration pattern are identified and, only if the number of iterations of steps B to F so far and/or the confidence value determined in the latest iteration of step F is/are equal to or above a threshold, characteristic points of the calibration pattern are identified within a set of candidate points which consists of the identified possible characteristic points. In particular, step D may be confined to executing a method that merely yields possible characteristic points at least in a first execution of step D so as to accelerate the computation, but may include a more precise method of identifying the characteristic points of the calibration pattern in possible subsequent iterations of step D.

The objective of the invention is furthermore solved by a computer program product in accordance with claim 13 and, in particular, by a computer program product with a computer program which has software means for carrying out a method in accordance with at least one of the embodiments described above, if the computer program is executed in a computing device. Due to the preferably low complexity of the calculations during execution of the method, the computer program may especially be suited to be executed on a microcontroller or an embedded system of the camera by means of which the image of the calibration pattern is acquired.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, m some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
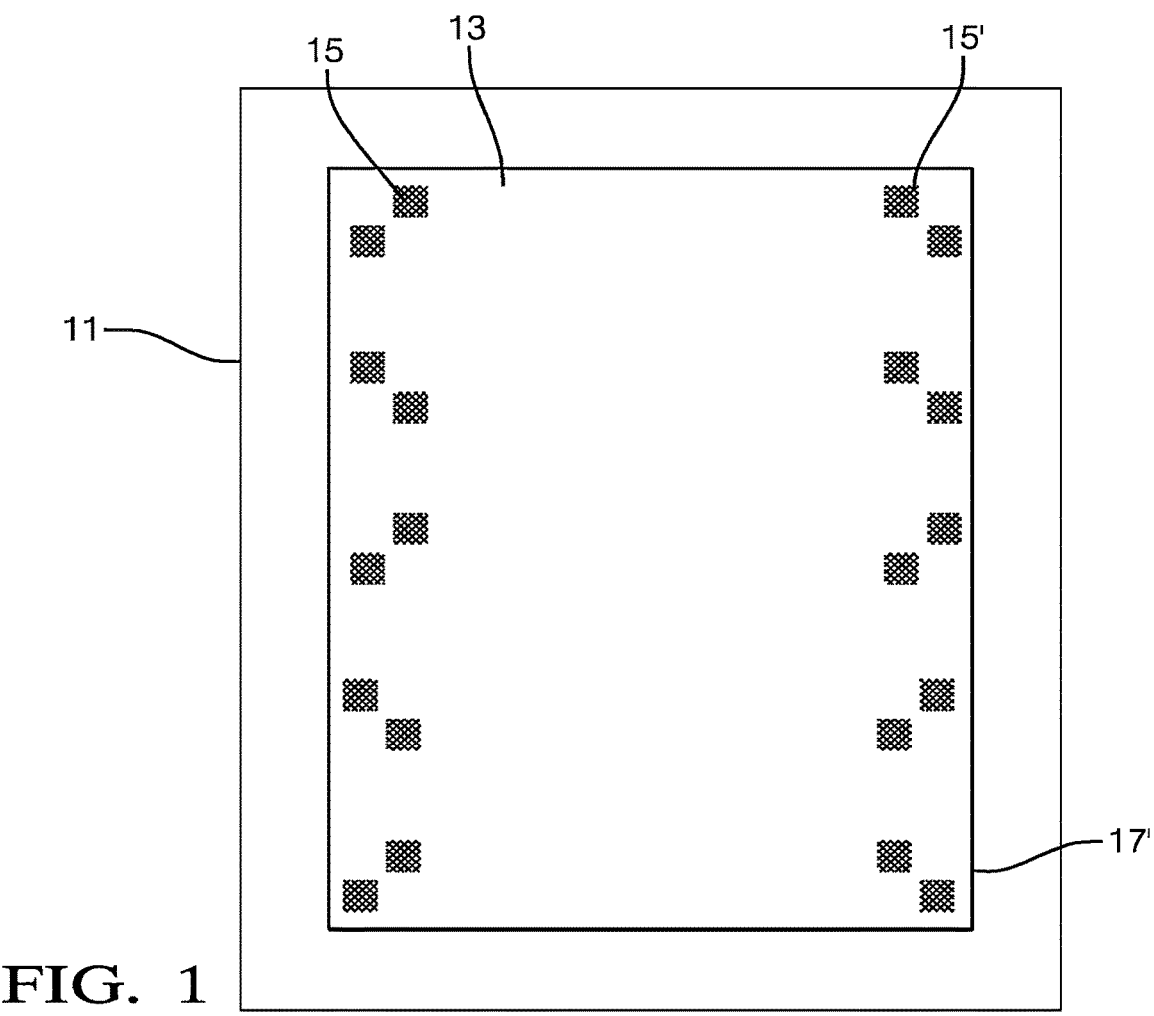
FIG. 1 is an image of a calibration pattern in accordance with one embodiment.

FIG. 1 shows an exemplary image 11 of a calibration pattern 13 acquired with a camera which is not shown. The calibration pattern 13 comprises ten sub-patterns 15, 15', representations of which can be recognized in the image I1. There are sub-patterns of a first type 15 and sub-patterns of a second type 15'. The sub-patterns 15, 15' of both types are each formed by two equally oriented squares, with a corner of one of the squares coinciding with a corner of the other of the squares, wherein the relative orientation of the two squares of a respective sub-patterns of the first type 15 is perpendicular to the relative orientation of the two squares of a respective sub-pattern of the second type 15'.

Five of the sub-patterns 15, 15' are arranged along a first vertical line, the other five along a second vertical line. Each of the sub-patterns 15, 15' on the first vertical line forms a pair with a respective sub-pattern 15, 15' on the second vertical line such that both sub-patterns 15, 15' of a respective pair are aligned on a horizontal line. Hence, in total there are five horizontal lines. While the two vertical lines and the five horizontal lines are not depicted and hence are no explicit part of the calibration pattern, they are unambiguously defined by the sub-patterns 15, 15', in particular by respective characteristic points of these sub-patterns 15, 15' which are situated at the centers of the sub-patterns 15, 15', where the two squares are in contact to each other. After identification of the characteristic points of the calibration pattern 13 which are the centers of the sub-pattern 15, 15' these horizontal and vertical lines can be derives and used to determine the position and/or orientation of the camera relative to the calibration pattern 13.

The camera used for acquiring the image 11 has a wide-angle objective. Mainly because of this, the calibration pattern 13 appears distorted in the image 11. While in reality the board which supports the calibration pattern 13 is rectangular, in the image 11 it appears to be inflated with bent borders. As can be seen by comparison with the straight lines of the black frame drawn into FIG. 1, the calibration pattern 13 is distorted in a similar manner.

The black frame defines a region of interest 17' within the image 11 and contains the calibration pattern 13. This region of interest 17' may be derived from an expected position of the calibration pattern 13 within the image 11 or be determined, for example, in relation to the bright region as which the said board with the calibration pattern 13 appears and which may be identified in the image 11 for example based on its extension and/or brightness. Processing of the image 11 and determinations based on the image 11 may advantageously be restricted to the region of interest 17' of the image 11 so as to reduce the computational effort and accelerate the execution.

Especially, by convolution of the image 11 (or possibly only the region of interest 17' of the image) with a filter kernel corresponding to the sub-patterns 15, 15' and identifying spots within the such-filtered image, possible characteristic points of the calibration pattern 13 can be determined (cf. white points in FIG. 1). Since these possible characteristic points also comprise false positives, they are candidate points which have to be further evaluated to identify the true characteristic points.

The true characteristic points are identified by searching for a point structure characteristic for the first sub-pattern 15 or for the second sub-pattern 15'. This is done by overlaying a template arrangement such that a principal point of the template arrangement coincides with the candidate point, with a first template arrangement being specific to the first sub-pattern 15 and a second template arrangement being specific to the second sub-pattern 15'. This is shown exemplarily in FIG. 2, wherein four specific regions of interest 17 around a respective candidate point (cf. central black asterisk) are shown. Such specific regions of interest 17 each of which only contains a single sub-pattern 15, 15' of the calibration pattern 13 may be defined alternatively or additionally to the said region of interest 17' containing the full calibration pattern 13. By restricting at least some of the processing of the image 11 and determinations based on the image 11 to such specific regions of interest 17 the computational effort can further be reduced. If the more general region of interest 17' had been determined before, the more specific regions of interest 17' may be determined based on their at least approximately known spatial relations to the more general region of interest 17'.

Figure 2:
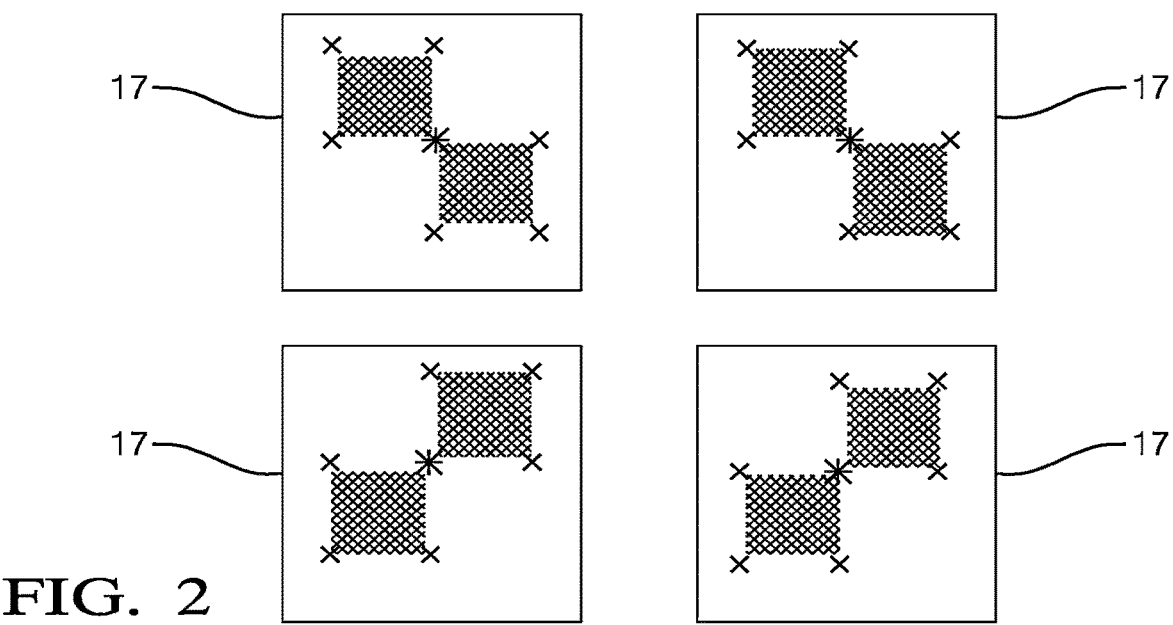
FIG. 2 is a template of a sub-pattern in accordance with one embodiment.

In FIG. 2 the white (horizontal and vertical) crosses are the candidate points within the respective region of interest 17. The black (diagonal) crosses are template points which together form the first or second template arrangement, respectively. The central template point depicted as black asterisk is the principal point of the template arrangement. Each region of interest 17 of FIG. 2 is shown including the candidate and template points contained therein together with the respective region of the image 11 so that the respective sub-pattern 15, 15' of the calibration pattern 13 can be recognized. The upper two regions of interest 17 correspond to the first sub-pattern 15, while the lower two regions of interest 17 correspond to the second sub-pattern 15'. Therefore, in the upper two regions of interest 17 the first template arrangement corresponding to the first sub-pattern 15 is shown, and in the lower two regions of interest 17 the second template arrangement corresponding to the second sub-pattern 15' is shown.

As can be seen from FIG. 2, the template points of a respective template arrangement, except the principal point, do not perfectly coincide with their closest candidate points. This is mainly due to the fact that the calibration pattern appears distorted in the image 11. The distortions lead to deviations that may impede the calibration of the camera and especially the identification of the (possible) characteristic points within the image 11 of the calibration pattern. In particular, the deviation may be such that a true characteristic point of the calibration pattern 13 is falsely discarded as spunous.

Figure 3:
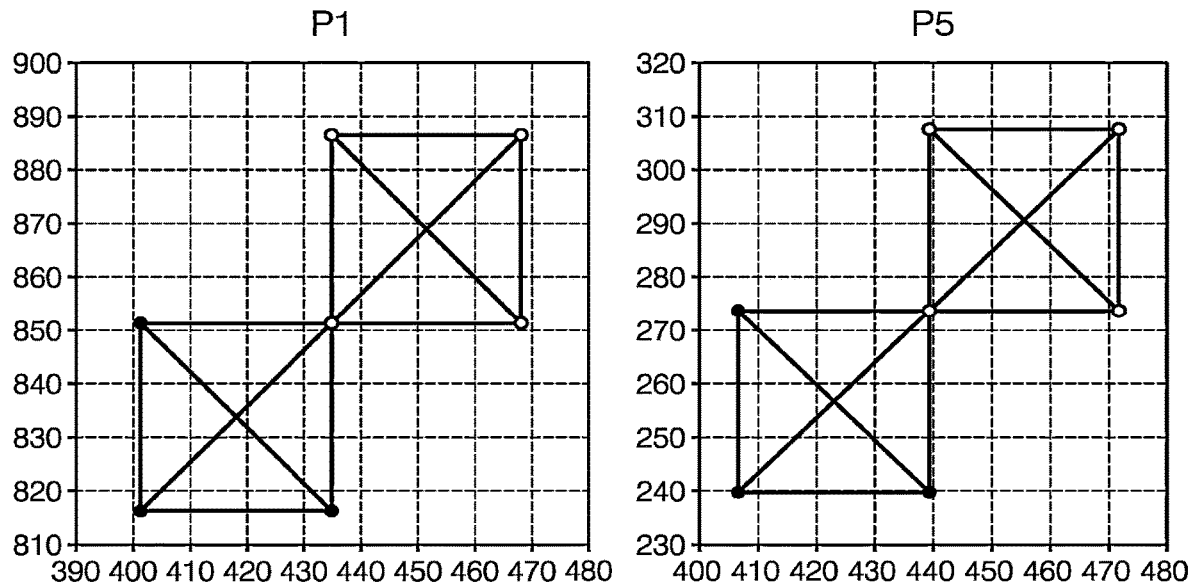
FIG. 3 shows computed positions of the corners of the sub-pattern in accordance with one embodiment.

FIG. 3 shows computed positions of the corners of the sub-pattern 15 for a sub-pattern 15 at the top of the calibration pattern 13 (FIG. 3, left) and for a sub-pattern 15 at the bottom of the calibration pattern 13 (FIG. 3, right). The positions are computed as if the image 11 of the calibration pattern 13 were acquired by a camera having no lens distortion. Nevertheless, the sub-patterns 15 shown in FIG. 3 do not have the same shape due to perspective distortions that are different depending on the direction from which the respective sub-pattern 15 is seen by the camera, this direction being different for a sub-pattern 15 at the top of the calibration pattern 13 than for a sub-pattern 15 at the bottom of the calibration pattern 13.

Figure 4:
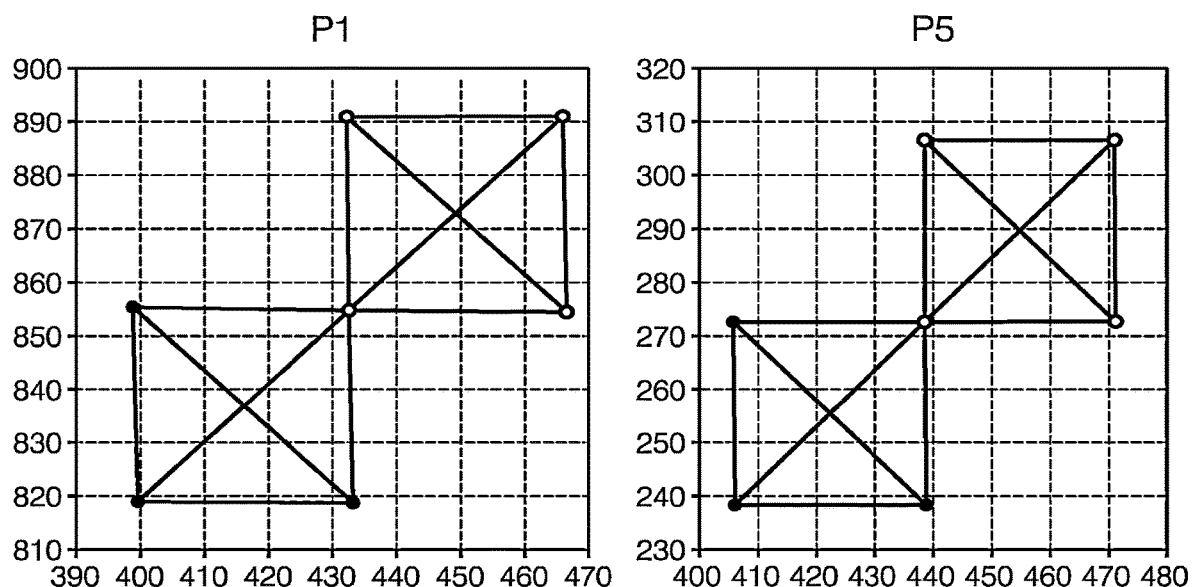
FIG. 4 shows computed positions of the corners of the sub-pattern in accordance with one embodiment.

FIG. 4 essentially corresponds to FIG. 3 with the difference that, in FIG. 4, the positions of the corners of the sub-pattern 15 are computed as they appear in an image 11 acquired by a camera having a medium lens distortion, such as a distortion resulting from a typical lens with a focal length of about 50 mm. A comparison of FIGS. 3 and 4 shows that, in FIG. 4, the sub-patterns 15 are more strongly distorted. Hence, for calibrating a wide-angle camera it is more important to compensate for such distortions. Such compensation can be achieved by methods according to the invention and, in particular, by executing the main steps required for determining the position and/or orientation of the camera relative to the calibration pattern 13 preferably at least twice, wherein in the first iteration the calibration steps may be performed in a coarser manner and lead to merely preliminary results, whereas in one or more subsequent iterations the preliminary results may be used as intermediate results to derive information about the distortion of the calibration pattern 13 and use this information to perform a correspondingly adapted calibration so as to finally obtain the position and/or orientation of the camera despite the distortions with improved precision. By optionally restricting the image 11 to one or more regions of interest 17, 17' (for example based on assumptions at first, but in subsequent iterations based on intermediate results), the additional computational effort for the repeated execution of at least some of the calibration steps may be compensated so that the time required for the calibration may not increase significantly or may even decrease.

While this invention has been described in terms of the preferred embodiments thereof, it is not intended to be so limited, but rather only to the extent set forth in the claims that follow.

What is claimed is:

1. A method comprising:
A] acquiring, from a camera, an image of a calibration pattern;
B] determining at least one parameter of the image or of the calibration pattern or a sub-pattern of the calibration pattern as it appears in the image;
C] transforming, by convolution, the image based on the at least one parameter, the convolution being defined as a summation in two dimensions of a product of a filter kernel and the image or smoothed image, a step size of the summation being greater in a first iteration of step C than in subsequent iterations of step C;
D] identifying characteristic points or possible characteristic points of the calibration pattern within the transformed image of the calibration pattern;
E] deriving at least one position or orientation of the camera relative to the calibration pattern from the identified characteristic points or possible characteristic points;
F] in dependence of a confidence value of the derived position or orientation of the camera or in dependence of a number of iterations of steps B to F so far, repeating steps B to F, wherein in repeating the step B the derived position or orientation of the camera is used for determining the at least one parameter; and G] outputting the position or orientation of the camera derived in the last iteration of step E for calibrating the position or orientation of the camera relative to the calibration pattern.

2. The method in accordance with claim 1, wherein:
in step B determining at least one parameter of the image comprises determining at least one region of interest within the image that includes the calibration pattern or a sub-pattern of the calibration pattern; and
in step C transforming the image comprises restricting the image to the at least one region of interest determined in step B and applying further transformations to the image after the restricting.

3. The method in accordance with claim 1, wherein:
in step B determining at least one parameter of the calibration pattern or a sub-pattern of the calibration pattern comprises determining at least one size or shape of the calibration pattern or sub-pattern as it appears in the image; and
in step C transforming the image comprises defining the filter kernel based on at least one determined size or shape of the calibration pattern or sub-pattern and filtering the image using the filter kernel.

4. The method in accordance with claim 1, wherein in step C transforming the image comprises smoothing the image by, for at least one pixel of the image, replacing a pixel value of the pixel by an average over the pixel values of pixels in a vicinity of the pixel, the vicinity of the pixel being defined in dependence of the at least one parameter determined in step B.

5. The method in accordance with claim 1, wherein in step C the filter kernel is defined in dependence of the at least one parameter determined in step B.

6. The method in accordance with claim 5, wherein the convolution of the image or smoothed image comprises the steps of:
deriving an integral image from the image or smoothed image by, for at least one pixel of the image or smoothed image, replacing a pixel value of the at least one pixel by a sum of the pixel values of pixels having smaller first and second coordinates than the at least one pixel; and
convolving the integral image with a modified filter kernel corresponding to the filter kernel.

7. The method in accordance with claim 5, wherein the step size of the summation depends on the number of iterations of steps B to F so far.

8. The method in accordance with claim 5, wherein the step size of the summation depends on the at least one parameter determined in step B.

9. The method in accordance with claim 1, wherein in step E deriving the position or orientation of the camera comprises calculating at least one of a lateral offset or a height of the camera relative to the calibration pattern or calculating at least one of a roll angle, a yaw angle or a pitch angle of the camera relative to the calibration pattern.

10. The method in accordance with claim 9, wherein:
in step B determining at least one parameter of the image comprises determining at least one region of interest within the image that includes the calibration pattern or a sub-pattern of the calibration pattern;
in step C transforming the image comprises restricting the image to the at least one region of interest determined in step B and applying further transformations to the image after restricting; and
in step B, except in the first iteration of step B, determining at least one region of interest comprises transforming the region of interest determined in an immediately preceding iteration of step B according to the calculated at least one of the roll angle, the yaw angle, or the pitch angle of the camera or to the calculated at least one of the lateral offset or the height of the camera.

11. The method in accordance with claim 9, wherein:
in step B determining at least one parameter of the calibration pattern or a sub-pattern of the calibration pattern comprises determining a size or shape of the calibration pattern or sub-pattern as it appears in the image;
in step C transforming the image comprises defining the filter kernel based on the determined size or shape of the calibration pattern or sub-pattern and filtering the image using the filter kernel; and
in step B, except in the first iteration of step B, determining the size or shape of the calibration pattern or sub-pattern comprises transforming the size or shape of the calibration pattern or sub-pattern determined in an immediately preceding iteration of step B according to the calculated at least one of a roll angle, a yaw angle or a pitch angle of the camera or to the calculated at least one of a lateral offset or a height of the camera.

12. The method in accordance with claim 1, wherein in step D possible characteristic points of the calibration pattern are identified and, only if the number of iterations of steps B to F so far or the confidence value determined in the latest iteration of step F is equal to or above a threshold, characteristic points of the calibration pattern are identified within a set of candidate points that consists of the identified possible characteristic points.

13. A system comprising:
at least one microcontroller configured to:
A] acquire, from a camera, an image of a calibration pattern;
B] determine at least one parameter of the image or of the calibration pattern or a sub-pattern of the calibration pattern as it appears in the image;
C] transform, by convolution, the image based on the at least one parameter, the convolution being defined as a summation in two dimensions of a product of a filter kernel and the image or smoothed image, a step size of the summation being greater in a first iteration of step C than in subsequent iterations of step C;
D] identify characteristic points or possible characteristic points of the calibration pattern within the transformed image of the calibration pattern;
E] derive at least one position or orientation of the camera relative to the calibration pattern from the identified characteristic points or possible characteristic points;
F] in dependence of a confidence value of the derived position or orientation of the camera or in dependence of a number of iterations of steps B to F so far, repeat steps B to F, wherein in repeating the step B the derived position or orientation of the camera is used for determining the at least one parameter; and
G] output the position or orientation of the camera derived in the last iteration of step E for calibrating the position or orientation of the camera relative to the calibration pattern.

14. The system in accordance with claim 13, wherein in step C the filter kernel is defined in dependence of the at least one parameter determined in step B.

15. The system in accordance with claim 14, wherein the convolution of the image or smoothed image comprises the steps of:
    deriving an integral image from the image or smoothed image by, for at least one pixel of the image or smoothed image, replacing a pixel value of the pixel by a sum of the pixel values of pixels having smaller first and second coordinates than the pixel; and
    convolving the integral image with a modified filter kernel corresponding to the filter kernel.

16. The system in accordance with claim 14, wherein the step size of the summation depends on the number of iterations of steps B to F so far.

17. The system in accordance with claim 14, wherein the step size of the summation depends on the at least one parameter determined in step B.

18. The system in accordance with claim 13, wherein the microcontroller is further configured to:
    in step E derive the position or orientation of the camera by at least calculating at least one of a lateral offset or a height of the camera relative to the calibration pattern or calculating at least one of a roll angle, a yaw angle or a pitch angle of the camera relative to the calibration pattern;
    in step B determine at least one parameter of the image by at least determining at least one region of interest within the image that includes the calibration pattern or a sub-pattern of the calibration pattern;
    in step C transform the image by at least restricting the image to the at least one region of interest determined in step B and applying further transformations to the image after restricting; and
    in step B, except in the first iteration of step B, determine at least one region of interest by at least transforming the region of interest determined in an immediately preceding iteration of step B according to the calculated at least one of the roll angle, the yaw angle, or the pitch angle of the camera or to the calculated at least one of the lateral offset or the height of the camera.

19. The system in accordance with claim 13, wherein, in step D, the microcontroller is further configured to:
    identify, based on a set of candidate points that consists of the identified possible characteristic points of the calibration pattern, characteristic points of the calibration pattern if at least one of the number of iterations of steps B to F so far or the confidence value determined in the latest iteration of step F is equal to or above a threshold.

20. The system of claim 13, wherein the system is embedded in a camera.

* * * * *